United States Patent [19]

Pugaczewski et al.

[11] Patent Number: 6,069,873
[45] Date of Patent: May 30, 2000

[54] CLOSED-LOOP AUTOMATED TESTING OF SYSTEM EQUIPMENT AND MANAGEMENT

[75] Inventors: John T. Pugaczewski, White Bear Lake; Jeffrey T. Kays, Andover; Nicholas P. Chantiloupe, St. Louis Park, all of Minn.

[73] Assignees: U S West, Inc., Denver; MediaOne Group, Inc., Englewood, both of Colo.

[21] Appl. No.: 08/943,354

[22] Filed: Oct. 1, 1997

[51] Int. Cl.[7] ................................. H04L 12/28
[52] U.S. Cl. ............................. 370/241; 370/249
[58] Field of Search .................. 370/241, 244, 370/245, 248, 249

[56] References Cited

U.S. PATENT DOCUMENTS

| | | | |
|---|---|---|---|
| 4,046,964 | 9/1977 | Daugherty et al. ............... | 370/244 |
| 4,424,421 | 1/1984 | Townsend et al. ............... | 370/248 |
| 4,989,202 | 1/1991 | Soto et al. . | |
| 5,029,168 | 7/1991 | Chan . | |
| 5,278,823 | 1/1994 | Handel . | |
| 5,307,354 | 4/1994 | Cramer et al. . | |
| 5,367,667 | 11/1994 | Wahlquist et al. . | |
| 5,410,681 | 4/1995 | Jessen et al. . | |
| 5,438,528 | 8/1995 | Emerson et al. . | |
| 5,455,933 | 10/1995 | Schieve et al. . | |
| 5,537,653 | 7/1996 | Bianchini, Jr. . | |
| 5,619,489 | 4/1997 | Chang et al. ............... | 370/241 |
| 5,790,523 | 8/1998 | Ritchie, Jr. et al. ............. | 370/241 |
| 5,881,051 | 3/1999 | Arrowood et al. ............. | 370/248 |

*Primary Examiner*—Hassan Kizou
*Assistant Examiner*—Daniel Prévil
*Attorney, Agent, or Firm*—Brooks & Kushman

[57] ABSTRACT

An automated closed-looped test system and method for testing network devices such as CPE and system network managers is arranged as a modular, comprehensive test system which seamlessly integrates physical layer testing with higher layer services protocol testing. A set of tests are generated based on the device or manager being tested. A selection menu provided via a GUI such as a Web browser allows a user to select the desired test option to be run. Test results are output in real time via the GUI, and can be logged in a form suitable for documentation.

5 Claims, 2 Drawing Sheets

CLOSED-LOOP AUTOMATED TESTING OF SYSTEM EQUIPMENT AND MANAGEMENT

TECHNICAL FIELD

The present invention generally relates to systems used to test network and customer premise equipment (CPE) performance for compliance with appropriate protocol standards, and more particularly to improvements in test automation, monitoring, and recording for such a system.

BACKGROUND ART

As use of the "information highway" becomes increasingly more prolific, so does the introduction of new products which provide access to the information highway. In such a competitive market, a need exists for ways of decreasing the cost and time involved with developing a finished product. To that end, systems and software have been implemented which facilitate expedited testing of a new product prior to release into the market.

However, known test arrangements have not proven completely satisfactory because they can only test equipment or management systems in isolation, and thus require substantial user interaction and time to provide comprehensive testing. In addition, known arrangements do not allow ongoing monitoring and reporting while a test is running.

DISCLOSURE OF THE INVENTION

It is therefore an object of the present invention to provide an improved method and system for automated testing which can be used for testing network devices such as CPE, the device's local management, any centralized (or distributed) network device manager, and network configurations of such devices and their respective network device manager(s).

It is another object of the present invention to provide an automated test method and system for testing user network devices or systems which is closed loop, i.e., can test both ends of a user system, and can reconfigure a user system as necessary to provide testing at both ends.

It is another object of the present invention to provide a method and system for automated testing which increases productivity by providing automated testing prior to initial release of a system or program as well as regression testing.

It is a further object of the present invention to provide an automated test method and system for testing user network devices or systems which utilizes a GUI common user interface for selecting a test plan, and displaying the test results in real-time.

It is still another object of the present invention to provide an automated test method and system which measures performance and verifies functionality.

It is yet another object of the present invention to provide an automated test method and system for testing user network devices or systems which is object oriented in testing protocol, thereby only requiring reconfiguration at an interface level for testing of different types of user devices and systems.

In accordance with these and other objects, the present invention provides a method for automated testing of network devices and system managers comprising the steps of interfacing the network device or manager to be tested with a test system having a main test processor subsystem, generating a set of tests to be run based on the type of network device or manager being tested, and providing a user with a GUI having selection menu indicating a set of possible test options. The set of tests corresponding to the selected test option are initiated after selection is complete. The results of each test are detected and automatically logged in a form suitable for output documentation. The tests results are also displayed in real time using the GUI as each result is detected.

In accordance with another aspect of the present invention, a system for automated, closed-loop testing of network devices and system managers comprises a main test workstation having a processor for generating a set of tests based on a network device or manager to be tested, and a test result output generator for displaying test results in real time using a GUI. A test interface is provided for connecting the device or manager being tested to the main test workstation. The processor provides a set of test options to a user through the GUI, and can store log each test result as the results are detected.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
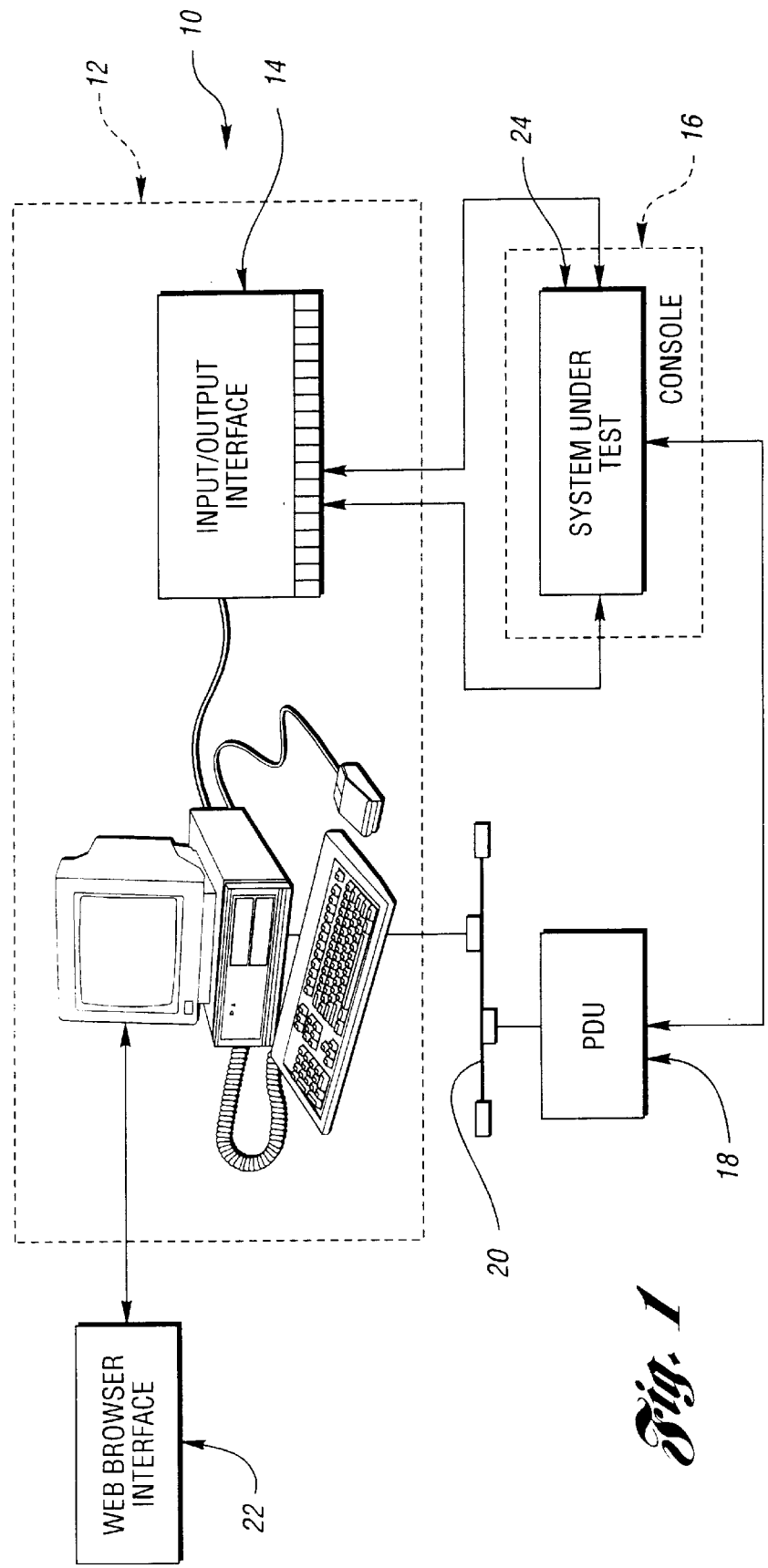
FIG. 1 is a block diagram of a closed-loop, automated test system in accordance with a basic configuration.

Referring to FIG. 1, an automated test system 10 in accordance with the present invention is shown as including a main test processor subsystem 12 coupled to a input/output interface 14 for connection to a system/console 16 to be tested. A programmable and customizable protocol data unit (PDU) 18 and sequence builder are also connected to main subsystem 12 via a bus 20. While PDU 18 is shown as a separate device from subsystem 12, such a configuration is not to be construed as limiting since the function of the PDU can be integrated into subsystem 12. As described more fully below, the preferred embodiment for automated test system 10 is arranged as a modular, comprehensive test system which seamlessly integrates physical layer testing of system 16 with higher layer services protocol testing.

In accordance with the present invention, verification testing of system 16 for compliance with appropriate protocol standards is done using a layered test protocol. More specifically, each layer of the seven layers specified by the standard Open Systems Interconnection (OSI) set of protocols are tested individually. A first set of tests are performed at the physical layer, followed by subsequent sets of tests for each of the link layer, network layer, transport layer, session layer, presentation layer, and application layer.

In the preferred embodiment, main subsystem 12 is programmed in accordance with known principles as an automated on-line system to test conformance, performance, and functionality with the seven layers of the OSI stack.

The present invention further includes a GUI-type interface such as Web browser interface 22 for allowing a user to select tests and capture results in a "living test plan" format. A "test plan" is provided in HTML format, and after execution, the results of each test are provided in HTML format, or suitable word processor or spreadsheet format. More specifically, a generic test plan is developed for a specific test or set of tests. The "Living Test Plan" consists of four sections for each test: (1) Purpose, (2) Procedure, (3) Expected Results, and (4) Observed Results.

The user is initially presented with a synopsis of all of the test options/purposes and the ability to select the desired tests to be run via a selection menu provided by Web browser interface 22. If desired, the user can hypertext link connect to a full test run. Once the user selects the desired test(s) to be run, the system initializes and begins running the tests. The results of each test are communicated back to the test plan "Observed Results" section of the respective test.

The results are dependent upon the test and are displayed in near real-time in multimedia format. Specifically, the results can be displayed in text, graphics, video, audio, or formatted for desktop publishing. For example, if the test was a throughput test, the "Observed Results" would display a graph of Input vs. Output and the graph would be displayed for each iteration as the test is actually being executed.

At completion, the user can save the test plan or re-run any or all of the tests again. The system further includes a protocol necessary to decode standard as well as proprietary protocols. For display via Web browser interface 22, test results are generated in HTML, word processor or spreadsheet format using multi-media representation such as graphs, spreadsheets, video, and audio.

System 10 is designed as a distributed test system which allows multiple hardware configurations, and can be run from one (1), two (2), or three (3) workstations. The preferred embodiment is implemented using a Hewlett Packard Broadband Series Test System, a UNIX-based PDU workstation system such as a Solaris 2.5, and a Web browser interface which supports Java applets. The use of a UNIX-based workstation facilitates upper layer protocol testing.

As noted above, the selection menu is provided to allow a user to select a set, or subset of available tests to be run. After selecting the desired set of tests, the user only has to initiate the selected testing sequence to begin the fully automated test run. Also as noted above, the test system automatically logs the results of each test, and in the preferred embodiment, this logging process includes reporting the result information in the living test plan on interface 22. To provide a common timestamp, the logging process can utilize a network timing protocol (NTP).

In addition to controlling the input/output port 14, the main test subsystem 12 is connected to control a console port of the system 16 being tested. Therefore, alarms and requisite commands typically generated by a system will be controlled via the testing protocol of test system 10.

Figure 2:
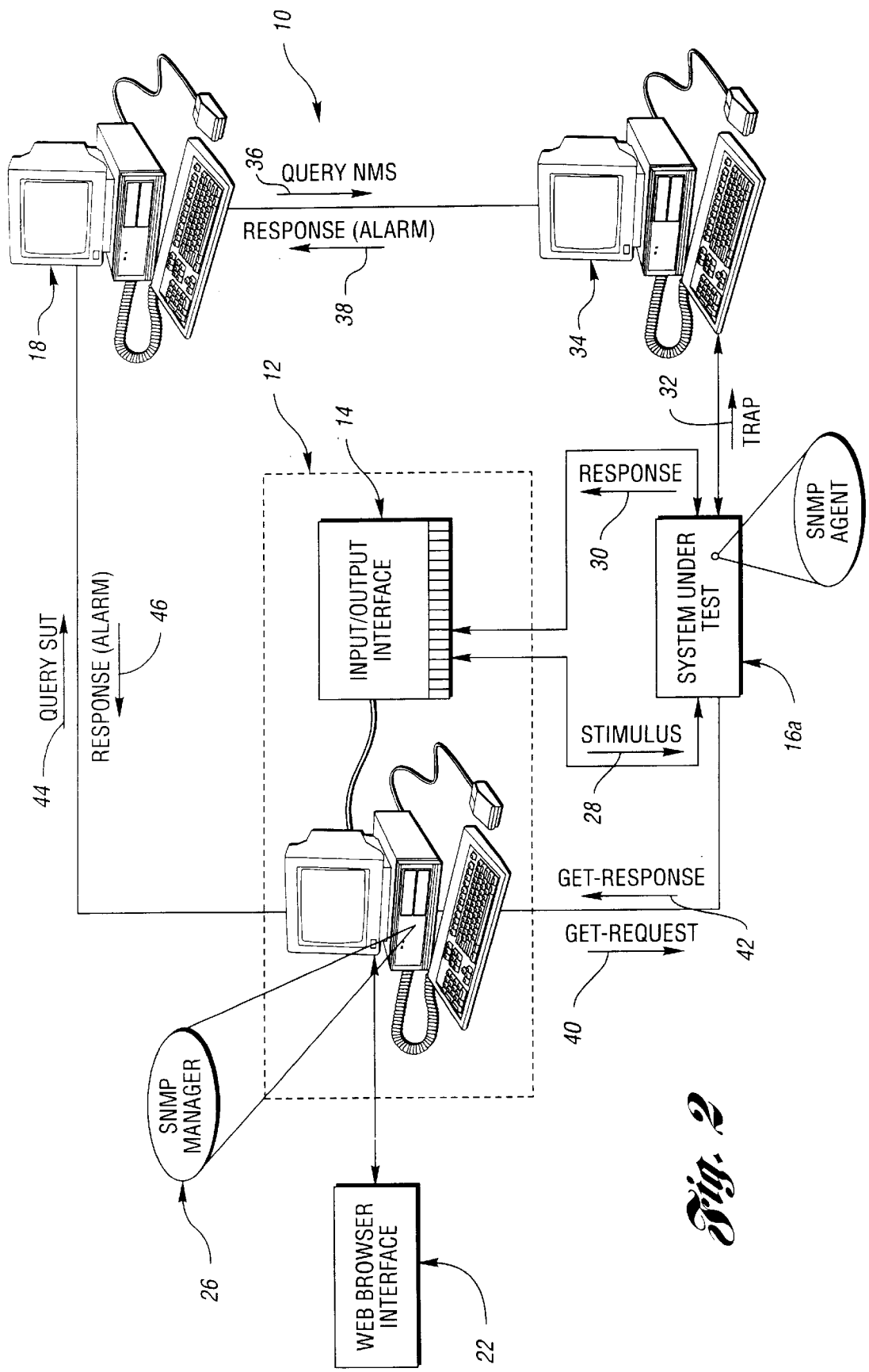
FIG. 2 is a block diagram of the closed-loop, automated test system configured for comprehensive testing of a network system and the system's network management system in accordance with the present invention.

For example, as shown in FIG. 2, test system 10 can be configured as a simple network management protocol (SNMP) based manager 26 to allow testing of SNMP-based agent software in a system 16(a). In this test example, the testing protocol of test system 10 selectively provides a stimulus 28 by injecting an inband error into system 16(a). This effects a change in a management information base (MIB) variable, and produces a response 30 which is monitored, logged, and displayed in the living test plan. Stimulus 28 also triggers a "trap" signal 32 being sent to a network management system (NMS) 34, which produces a corresponding alarm record. The PDU sends a query 36 to NMS 34, which sends an alarm response 38 back to the PDU.

After the stimulus is initiated, in accordance with known protocol programming, a SNMP "Get Request" 40 would be issued by the SNMP Manager 26 under control of the test system 10. Test system 10 would then monitor the tested system's response to verify that the proper SNMP "Get Response" 42 is generated. This information is then processed by PDU 18 via an appropriate query 44 and response 46.

As another example, when testing a channel service unit/data service unit (CSU/DSU), the test protocol would begin the testing process by opening a log file. A time stamp would then be written and the first test stimulus or predetermined error would be inserted and logged. If the stimulus caused an alarm condition in CSU/DSU, the results of the stimulus would be received at interface 14 and stored in the opened log file. The alarm is also transmitted to the console port of the CSU/DSU to monitor the response of the console to the triggered alarm. On the other hand, if the stimulus does not cause an alarm condition but trips a counter, the stimulus is provided and logged, and a command is issued by the test system to the device under test and the results logged. Thus, a completely integrated test system is created with the results logged for documentation.

In further accordance with the present invention, system 10 testing protocol operates using a controlled-iterative strategy. More specifically, a controlled-iterative development process operates by eliminating critical risks as its iteration driver, including continuous active identification, prioritization, and elimination of risk items throughout a test run. This process begins with requirements definition and analysis, followed by development of an initial architecture. Critical risk aspects of the design are then identified and prioritized.

A design element may involve risk intrinsically or because it is derived from requirements that are ambiguous, poorly understood, or likely to change. The highest priority critical-risk item is chosen as the driver for the first iteration, which is planned as a minimum implementation that, when constructed, can objectively demonstrate the resolution of the targeted risk. Ideally, this demonstration is accomplished by successful execution of a set of tests, thereby providing both objectivity and a means of detecting regression during subsequent iteration. Further, because of this approach, the test system of the present invention facilitates system testing early in the development design cycle, thereby avoiding typical "big bang" integration and testing efforts that overload developers.

While the best mode for carrying out the invention has been described in detail, those familiar with the art to which this invention relates will recognize various alternative designs and embodiments for practicing the invention as defined by the following claims.

What is claimed is:

1. A method for automated closed loop testing of network devices and system managers comprising the steps of:

interfacing the network device or manager to be tested with a closed loop test system having a main test processor subsystem;

generating a set of tests to be run based on the type of network device or manager being tested;

providing a user with a graphical user interface (GUI) having a selection menu indicating a set of possible test options;

initiating the set of tests corresponding to a selected test option;

detecting and automatically logging each test result in a form suitable for output documentation; and displaying the tests result in real time using the GUI when each result is detected.

2. The method of claim 1 wherein said step of generating a set of tests comprises generating a set of tests which inject predetermined errors into the tested device.

3. A closed loop test system for automated testing of network devices and system managers comprises:

a main test workstation comprising a processor for generating a set of tests based on a type of network device or manager to be tested, and a test result output generator for displaying test results in real time using a graphical user interface (GUI); and a test interface for connecting the device and manager being tested to said main test workstation, wherein said processor provides a set of test options to a user through the GUI, and displays the result of each selected test as the result is detected.

4. The system of claim 3 wherein the set of test options are provided to the user as a selection menu in a Hyper Text Markup Language (HTML) document.

5. The system of claim 3 wherein said processor is arranged to generate a set of tests which introduce a plurality of predetermined errors into the tested device or manager.

* * * * *